United States Patent [19]

Kawabe

[11] Patent Number: 4,569,098
[45] Date of Patent: Feb. 11, 1986

[54] DISC-CLEANING DEVICE
[75] Inventor: Hirokazu Kawabe, Tokyo, Japan
[73] Assignee: Kabushiki Kaisha Nagaoka, Tokyo, Japan
[21] Appl. No.: 604,703
[22] Filed: Apr. 27, 1984
[30] Foreign Application Priority Data Feb. 3, 1984 [JP] Japan ............................ 59-14671[U]

[51] Int. Cl.$^4$ .............................................. G11B 3/58
[52] U.S. Cl. .................... 15/114; 15/210 R; 15/268; 206/309; 360/137; 369/72
[58] Field of Search .................. 15/160, 210 R, 105, 15/114, 118, 268, DIG. 14; 220/23; 206/309; 369/72; 360/137; 132/79 R, 79 A, 79 D, 82 R

[56] References Cited

U.S. PATENT DOCUMENTS

| 4,023,677 | 5/1977 | Wittner | 15/114 |
| 4,520,470 | 5/1985 | d'Arc | 369/72 |

Primary Examiner—Edward L. Roberts
Attorney, Agent, or Firm—James E. Nilles

[57] ABSTRACT

A disc-cleaning device wherein a cleaner having a cleaning portion for wiping the surface of a disc provided on the under surface thereof and a knob on the top surface thereof is housed in a case made by securing a cover to a support for the disc so that said cover can be opened and closed. The cover has a recess on the inside thereof into which the knob is received. The support has a disc-supporting depression in which the disc fits, and a mat is laid in the disc-supporting depression to support the underside of the disc. Notches are made at either side of the disc-supporting depression in which the disc fits, and the edge of the disc fitted into the disc-supporting depression projects from both of the notches. A brush member is removably attached to the cover.

7 Claims, 4 Drawing Figures

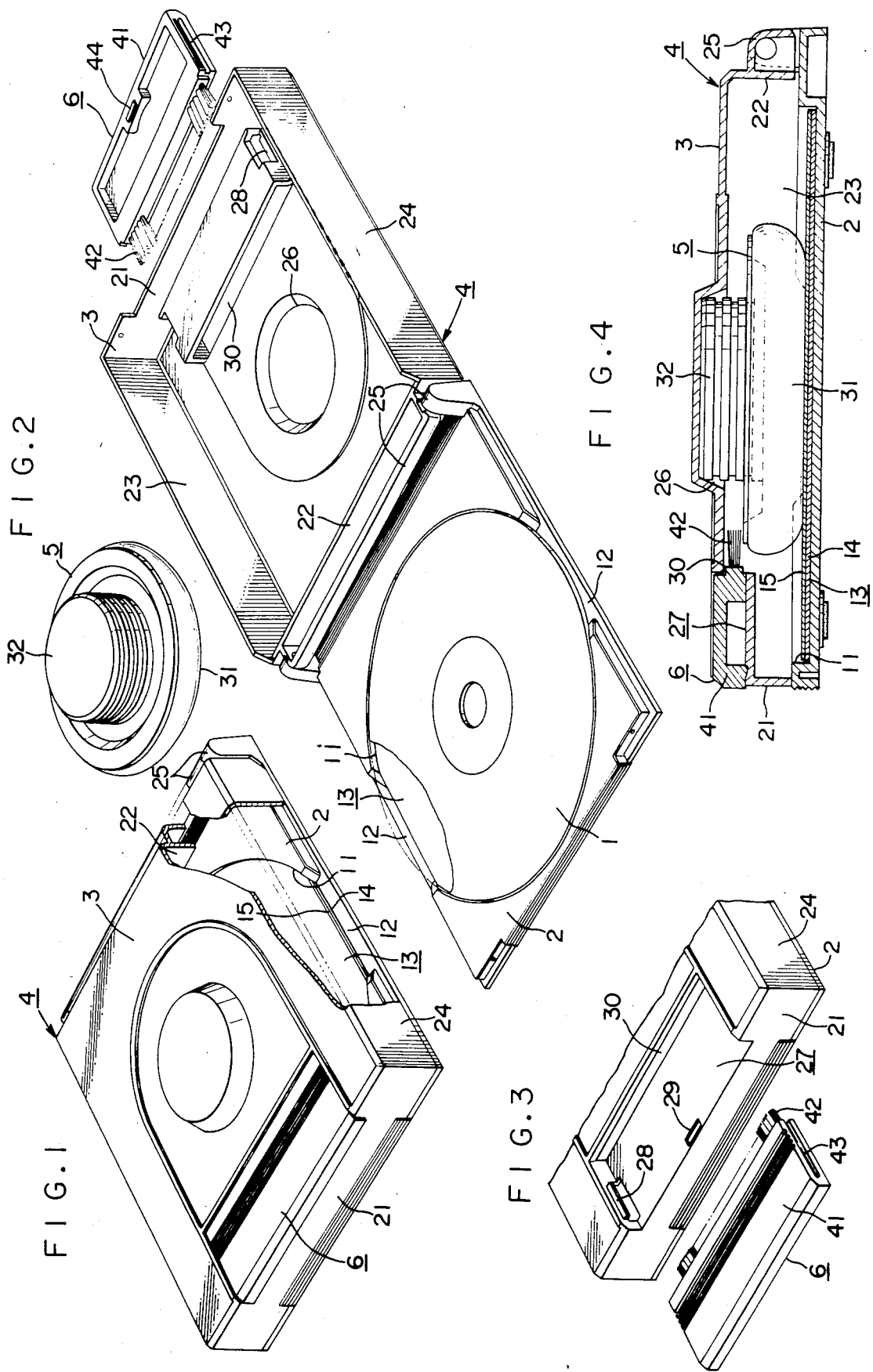

DISC-CLEANING DEVICE

BACKGROUND OF THE INVENTION

1. Field of the Invention

This invention relates to a disc-cleaning device, and in particular to a cleaning device which can wipe surfaces the so-called 'compact disk' which is an audio disc utilizing a digital recording method.

2. Description of the Prior Art

The so-called 'compact disk' is not susceptible to the effects of dust, because its sides are covered with transparent plastic.

However, if the transparent plastic becomes stained or covered with fingerprints, the strength of a reflected laser beam will vary according to the staining, which will result in noise or the dropout of the reproduced sound.

Therefore it is necessary to wipe stains off the surface of such a disc.

It is comparatively easy to clean an analog audio disc by wiping the surface of the disc when it is on the turntable of an analog disc player. With a 'compact disk', however, the unsuitable shape of the disc supporter of a 'compact disk' player makes it difficult to clean the 'compact disk', so that it is generally necessary to hold the disc directly in one hand and a cleaner in the other to wipe the surface of the disk, but it is awkward trying to wipe a disc with one hand.

Cleaning mats designed for cleaning analog audio discs are now on the market, they make it easier to clean analog discs when placed upon them.

If such a cleaning mat could be made of a size in accordance with that of a 'compact disk', and is used for cleaning the disc with a cleaner, the cleaning can be done easily because it would not be necessary to hold the disc in one hand.

In this way, in order to facilitate the cleaning of a 'compact disk', a cleaner is always used in combination with a cleaning mat.

However, the cleaner and cleaning mat are separate items, and if they are kept separately one of them could be lost. If the cleaner can not be found when a disc is to be cleaned, the cleaning can not be done, and if the cleaning mat can not be found, the cleaning is not easy because it is necessary to hold the 'compact disk' in one hand.

SUMMARY OF THE INVENTION

It is, accordingly, an object of the present invention to provide a disc cleaner which facilitates the cleaning, in which it is possible to wipe a disc easily without holding it by providing a cleaning support holding the disc, and which ensures that both the cleaner and the support can be used together without either of them getting lost, by keeping both of them in a single case.

The disc-cleaning device of this invention which accomplishes this object comprises a case made by securing a cover to a support for a disc so that the cover can be opened and closed, and a cleaner housed in the case, wherein the cover has a knob-receiving recess on the inside thereof, and the under surface of the cleaner has a cleaning portion for wiping the surface of the disc and the top surface thereof has a knob which fits into the knob-receiving recess inside the cover, so that the cleaning can be done with the disc placed on the support; and when stored the cleaner can be housed in the case with the knob fitting into the knob-receiving recess inside the cover.

Other objects and characteristics of the present invention will be described hereinunder with reference to the accompanying drawings.

BRIEF DESCRIPTION OF THE DRAWINGS

FIG. 1 is a partially cutaway perspective view of an embodiment of the device of this invention;

FIG. 2 is a perspective view of the embodiment with its cover open and a disc placed on the receiver;

FIG. 3 is a perspective view of the brush member and the recess for the brush member; and FIG. 4 is a longitudinal section through the embodiment of this invention when stored.

DESCRIPTION OF THE PREFERRED EMBODIMENT

The disc-cleaning device of this invention is provided with a case 4 made by securing a cover 3 to a support 2 for a 'compact disk' 1 so that it can be opened and closed, a cleaner 5 housed in the case 4 and a brush member 6 which is removably attached to the cover 3 of the case 4 and which is used to remove the dust, etc., which collects on the cleaner 5 during its cleaning of the 'compact disk' 1.

The support 2 of the case 4 has a rectangular board-like shape and is provided with a circular disc-supporting depression 11 of a diameter slightly greater than that of the 'compact disk' 1 (about 12 cm). The disc-supporting depression 11 is provided with notches 12 cut in opposite sides of the support 2, and a mat 13 is laid within the base of the disc-supporting depression 11 to receive the underside of the 'compact disk' 1. The mat 13 has two layers, a lower mat 14 and an upper mat 15. The lower mat 14 is made of a foamed material such as urethane and is resilient, the upper mat 15 is of material with a comparatively large coefficient of friction with respect to the underside of the 'compact disk' 1, such as chamois, and these mats 14, 15 are of a diameter substantially the same as that of the 'compact disk' 1 and are cut out to correspond to the notches 12 on both sides of the disc-supporting recess 11.

The cover 3 is made of light-transmitting synthetic resin such as a transparent synthetic resin, is formed in the same rectangular shape as the support 2, and has a front wall 21, a rear wall 22, a left side wall 23 and a right side wall 24. The rear edge of the support is pivotably attached to the rear wall 22 of the cover 3 by hinges 25, and two protrusions, either side of the inner surface of the front wall 21 can engage with corresponding indentations in the front edge of the support 2 when the cover is thus closed.

A circular depression 26 is formed in the central part of the cover 3 so that the outer surface thereof protrudes outward. A recess 27 into which a brush member 6 can fit removably is formed between the outer surface of the front wall 21 of the cover 3 and the top surface of the cover 3. This brush-receiving recess 27 has a rectangular shape when viewed from above, and guide protrusions 28 are formed along the inner surfaces of each of opposite side walls thereof perpendicular to the longitudinal direction of the front wall 21 of the cover 3, so as to engage slidably with the interior of the brush member 6. An engagement indentation 29 is formed in the base thereof facing the front wall 21 of the cover 3 so that it can engage with the brush member 6 and hold the brush member 6, and the whole of the wall thereof opposite the front wall 21 of the cover 3 is cut out to form an opening 30 extending into the interior of the cover 3.

The lower surface of the cleaner 5 is provided with a cleaning portion 31 which wipes the surface of the 'compact disk' 1, and the top surface thereof is provided with a knob 32 fitting into a knob-receiving recess 26 on the inside of the cover 3. The cleaning portion 31 is made of an elastic core material such as urethane, covered with chamois.

The brush member 6 has a rectangular handle 41 which can fit removably into the brush-receiving recess 27, and a brush 42 attached along one longer side of the handle 41. Guide channels 43 corresponding to the guide protrusions 28 are formed along short sides thereof, either side of the longitudinal direction of the handle 41, and an engagement protrusion 44 is formed on the under surface of the other long side thereof so as to engage with the corresponding engagement indentation 29 formed in the base surface of the brush-receiving recess 27.

The cleaner 5 is usually housed in the case 4 with the knob 32 fitting into the knob-receiving recess 26 within the cover 3. Consequently the cleaner does not move because it is located by the knob-receiving recess 26. The brush member 6 fits into the brush-receiving recess 27 with the guide protrusions 28 sliding along the guide channels 43, and the brush 42 is inserted into the interior of the cover 3 through the opening 30 of the brush-receiving recess 27, so that the brush 42 is protected by the cover 3. When cleaning the 'compact disk' 1, the cover 3 is first opened and the cleaner 5 removed, and then the 'compact disk' 1 is placed on the mat 13 of the disc-supporting depression 11 of the support 2 so that the 'compact disk' 1 is located by the disc-supporting depression 11, and its edge projects from the notches 12 on either side of the disc-supporting depression. Dust and stains, etc., is wiped off the surface of the 'compact disk' 1, by the cleaner 5 by moving it in a direction perpendicular to its circumference, i.e., from the center of the 'compact disk' 1 to its outer periphery or vice versa. The 'compact disk' 1 is wiped in this direction because 0 and 1 pulse codes are formed in a high-density spiral approximately along the circumferential direction on the 'compact disk' 1 and are read by a reader using a laser beam. Some degree of signal error can be corrected by a judgement of the context of signals either side of dropped signals, but if the surface of the disk 1 is wiped in the circumferential direction, which is virtually the same direction as that of the spirally-recorded signals, and if the transparent plastic is damaged thereby, to produce an extended dropout of a series of signals, an excessively lack of signals could makes it impossible to correct from the context of the signals.

The 'compact disk' 1 will tend to be moved off the mat 13 by friction with the cleaner 5 when it is wiped in this direction, but according to this invention, the 'compact disk' 1 is located by the disc-supporting depression 11 so that it does not move.

The dust, etc., collected on the cleaning portion 31 of the cleaner 5 by the cleaning is then brushed off by the brush 42 of the brush member 6 which has been removed from the brush-receiving recess 27.

When the cleaning is finished, the 'compact disk' 1 is removed from the disc-supporting depression 11 of the support 2. Since the edge of the 'compact disk' 1 projects from the notches 12 on either side of the disc-supporting depression 11, the 'compact disk' 1 can be removed easily by holding the projecting parts.

The cover 3 is then turned so that it is inside up, the cleaner 5 is placed upside down with its knob 32 in the knob-receiving recess 26 inside the cover 3, the support 2 is swung about the axis of the hinges 25 to close the case 4, and the brush member 6 is housed in the brush-receiving recess 27. Thus, the cleaner 5 is housed in the case 4 which is composed of the support 2 for the cleaning and the cover 3, and the brush member 6 is fitted into the brush-receiving recess 27. In this way, all the articles needed for the cleaning are housed in a single unit, so that there is no possibility of losing one of them.

Although the invention has been described with respect to a preferred embodiment thereof in which it is used for cleaning a 'compact disk' 1, a device of this invention can be used for cleaning of conventional analog audio discs or optical laser discs used as video discs.

According to the present invention, the cleaning is done easily with the disc placed on a support without holding the disc directly.

When stored, the cleaner is housed in a case composed of the support and a cover, so that there is no possibility of separating the cleaning support and the cleaner, and losing one, and thus it is possible to always use both together.

Since, the cleaner is housed in the case with its knob fitted into a knob-receiving recess within the cover, it does not move.

I claim:

1. A disc-cleaning device comprising a case made by securing a cover to a support for a disc so that said cover can be opened and closed, and a cleaner housed in said case, wherein said cover has a knob-receiving recess on the inside thereof, and said cleaner has a cleaning portion for wiping the surface of the disc provided on the under surface thereof and a knob fitting into said knob-receiving recess inside said cover on the top surface thereof.

2. The disc-cleaning device according to claim 1, wherein said support has a disc-supporting depression in which said disc fits, and a mat is laid in said disc-supporting depression to support the underside of said disc.

3. The disc-cleaning device according to claim 2, wherein notches are made at either side of said disc-supporting depression in which said disc fits, and the edge of said disc fitted into said disc-supporting depression projects from both of said notches.

4. The disc-cleaning device according to claim 2, wherein a brush member is removably attached to said cover.

5. The disc-cleaning device according to claim 1, wherein a brush member is removably attached to said cover.

6. The disc-cleaning device according to claim 5, wherein a brush-receiving recess is provided on the outer surface of said cover of said case, into which said brush member can fit removably.

7. The disc-cleaning device according to claim 6, wherein said brush-receiving recess has a side wall which is cut to form an opening extending into the interior of said cover, said brush member is composed of a handle with a brush attached to one side of said handle, and said brush is inserted into the interior of said cover so as to fit into said brush-receiving recess.

* * * * *